(12) United States Patent
Prodić et al.

(10) Patent No.: US 8,115,459 B2
(45) Date of Patent: Feb. 14, 2012

(54) ESR ZERO ESTIMATION AND AUTO-COMPENSATION IN DIGITALLY CONTROLLED BUCK CONVERTERS

(75) Inventors: Aleksandar Prodić, Toronto (CA); Zhenyu Zhao, Burlington (CA); Sheikh Mohammad Ahsanuzzaman, Toronto (CA)

(73) Assignee: Exar Corporation, Fremont, CA (US)

( * ) Notice: Subject to any disclaimer, the term of this patent is extended or adjusted under 35 U.S.C. 154(b) by 338 days.

(21) Appl. No.: 12/506,457

(22) Filed: Jul. 21, 2009

(65) Prior Publication Data

US 2010/0117615 A1    May 13, 2010

Related U.S. Application Data

(60) Provisional application No. 61/083,398, filed on Jul. 24, 2008.

(51) Int. Cl.
G05F 1/656 (2006.01)
(52) U.S. Cl. ......... 323/222; 323/283; 323/172; 713/300
(58) Field of Classification Search .............. 363/17–20, 363/89, 95, 97, 98, 39, 56.12; 323/222, 225, 323/255, 259, 282–288, 272; 327/172–175; 315/291, 307; 713/300, 310, 320, 330, 340
See application file for complete search history.

(56) References Cited

U.S. PATENT DOCUMENTS

| | | | |
|---|---|---|---|
| 5,668,464 A * | 9/1997 | Krein et al. | 323/259 |
| 6,181,120 B1 * | 1/2001 | Hawkes et al. | 323/282 |
| 6,784,644 B2 * | 8/2004 | Xu et al. | 323/225 |
| 6,940,189 B2 * | 9/2005 | Gizara | 307/151 |
| 7,088,012 B2 * | 8/2006 | Gizara | 290/43 |
| 7,245,512 B2 * | 7/2007 | Leung et al. | 363/95 |
| 7,319,312 B2 | 1/2008 | Leung et al. | |
| 7,459,893 B2 * | 12/2008 | Jacobs | 323/282 |
| 7,902,800 B2 * | 3/2011 | Jain et al. | 323/224 |
| 7,923,974 B2 * | 4/2011 | Martin et al. | 323/212 |
| 2002/0118000 A1 | 8/2002 | Xu et al. | |
| 2006/0022214 A1 * | 2/2006 | Morgan et al. | 257/99 |
| 2006/0023479 A1 | 2/2006 | Leung et al. | |

OTHER PUBLICATIONS

U.S. International Searching Authority, International Search Report and Written Opinion for International Appln. No. PCT/US2009/051719, Sep. 15, 2009, 8 pages.
Buso, et al., Simple Digit Control Improving Dynamic Performance of Power Factor Preregulators, 1997, pp. 103-109, IEEE, University of Padova.
Chen, et al., Predictive Digital Current Programmed Control, Jan. 2003, pp. 411-419, vol. 18, No. 1, IEEE Transactions of Power Electronics.
Mattingly, Designing Stable Compensation Networks for Single Phase Voltage Mode Buck Regulators, Technical Brief 417, Dec. 2003, pp. 1-10, Intersil.

(Continued)

Primary Examiner — Rajnikant Patel
(74) Attorney, Agent, or Firm — Fliesler Meyer LLP

(57) ABSTRACT

One embodiment of the present invention is a digitally controlled DC-DC converter comprising of a power stage including at least one switch and an output capacitor. A digital controller can control the switching of the at least one switch. The digital controller can include logic to produce an indication related to a zero resulting from the equivalent series resistance (ESR) of the output capacitor and to update the control of the switching of the switch in the power stage based on the estimate.

25 Claims, 6 Drawing Sheets

OTHER PUBLICATIONS

Miao, et al., Automated Digital Controller Design for Switching Converters, 2005, pp. 2729-2735, IEEE, Colorado Power Electronics Center.

Miao, et al., System Identification of Power Converters with Digital Control Through Cross-Correlation Methods, Sep. 2005, pp. 1093-1099, vol. 20, No. 5, IEEE Transactions on Power Electronics.

Patella, et al., High-Frequency Digital PWM Controller IC for DC-DC Converters, Jan. 2003, pp. 438-446, vol. 18, No. 1, IEEE Transactions on Power Electronics.

Peterchev, et al., Design of Ceramic-Capacitor VRM's with Estimated Load Current Feedforward, 2004, pp. 4325-4332, 2004 35th Annual IEEE Power Electronics Specialist Conference, Aachen, Germany.

Prodic, at al., Design of a Digital PID Regulator Based on Look-Up Tables for Control of High-Frequency DC-DC Converters, 2002, pp. 18-22, IEEE, Colorado Power Electronics Center.

Rahman, et al., Digital Pulse-Frequency/Pulse-Amplitude Modulator for Improving Efficiency of SMPS Operating Under Light Loads, Jul. 16-19, 2006, pp. 149-153, 2006 IEEE Compel Workshop, Rensselaer Polytechnic Institute, Troy, NY.

Stefanutti, Autotuning of Digitally Controlled DC-DC Converters Based on Relay Feedback, Jan. 2007, pp. 199-207, vol. 22, No. 1, IEEE Transactions on Power Electronics.

Zhao, et al., Limit-Cycle Oscillations Based Auto-Tuning System for Digitally Controlled DC-DC Power Supplies, Nov. 2007, pp. 2211-2222, vol. 22, No. 6, IEEE Transactions on Power Electronics.

\* cited by examiner

ESR ZERO ESTIMATION AND AUTO-COMPENSATION IN DIGITALLY CONTROLLED BUCK CONVERTERS

CLAIM OF PRIORITY

This application claims priority from the following application, which is hereby incorporated in its entirety: U.S. Provisional Application No. 61/083,398 entitled: "ESR ZERO ESTIMATION AND AUTO-COMPENSATION IN DIGITALLY CONTROLLED BUCK CONVERTERS", by Zhenyu Zhao, et al., filed Jul. 24, 2008.

BACKGROUND

In DC-DC buck converters, the output capacitor Equivalent Series Resistance (ESR) introduces a left-hand plane zero in converter's transfer function. The zero influences the loop response therefore must be taken into account in compensator design. Otherwise, the system could suffer from low speed, less phase margin or even instability. Since the end customers may use different types of capacitors, the ESR value is not always known/certain during the board design phase. Even for capacitors with known ESRs, their values vary significantly due to tolerances and temperature. Therefore, the application engineers usually have to go through a tedious process of reconfiguring the compensation networks iteratively.

Digital control of dc-dc switch mode power supply has gradually matured over the past 10 years. One of the most attractive features of digital control is the online system identification and auto-compensation. Component variations of the power stage are identified and compensator is redesigned/retuned accordingly to achieve the desired dynamic response. Most of the existing Process Identifier (PID) auto-tuning methods focus on identifying the power stage corner frequency. Another important variable, capacitor ESR zero frequency, is seldom considered or modeled.

In one prior art system, PID compensator design is based on a complete frequency domain identification including the ESR zero. However, the method requires open-loop operation and heavy computations. Therefore, it is not suitable for online operation in low-power cost-effective applications.

DETAILED DESCRIPTION

One embodiment of the present invention is a method for estimating and compensating the zero in power stage transfer function introduced by the capacitor ESR. The ESR zero can be estimated by online measuring the output voltage ripple. A PID compensator can be updated based on the identified zero to avoid stability problems.

Figure 1:
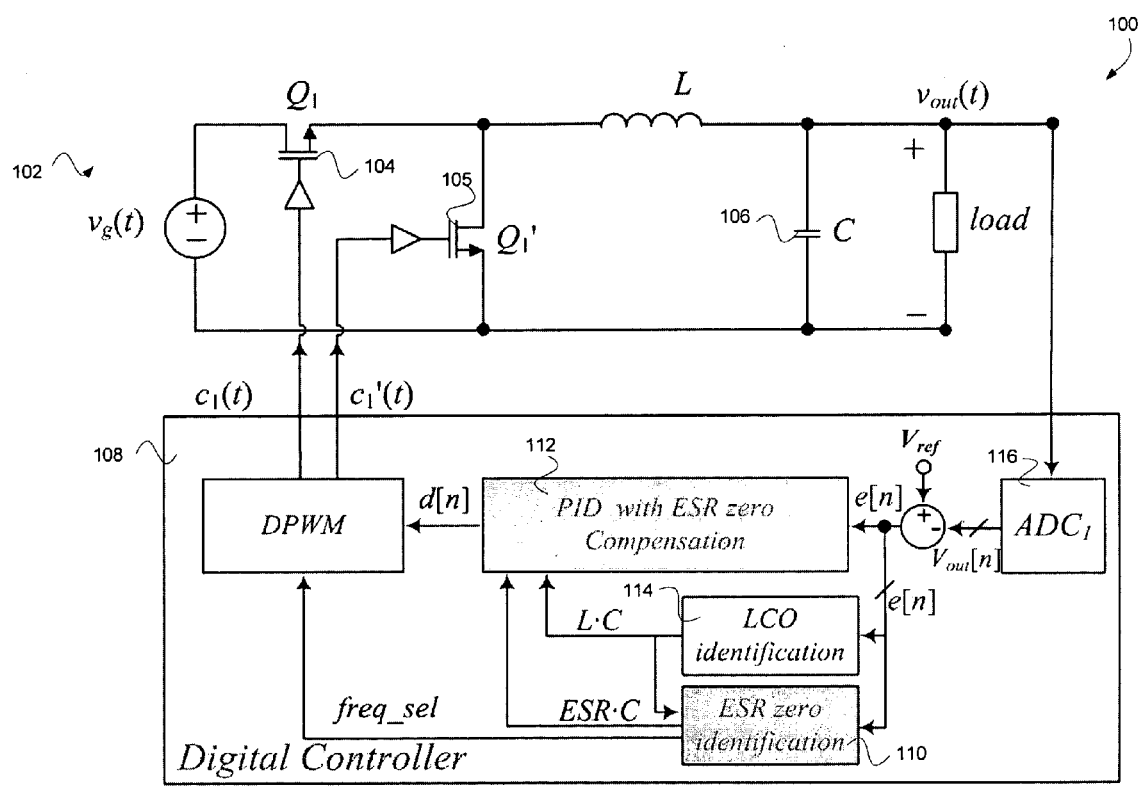
FIG. 1 illustrates a digitally controlled buck converter with ESR zero auto-compensation of one embodiment.

FIG. 1 shows a digitally controlled buck converter with ESR zero auto-compensation.

A digitally controlled DC-DC converter 100 can comprise a power stage 102 including at least one switch 104 and 105 and an output capacitor 106. A digital controller 108 can control the switching of the at least one switch. The digital controller can include logic to produce an indication related to a zero resulting from the ESR of the output capacitor 106 and to update the control of the switching of the switch in the power stage based on the indication.

In one embodiment, an ESR zero identification block 110 can determine the indication of the zero resulting from the ESR of the output capacitor 106.

The indication can be an estimate of the total ESR times the capacitance value ($R_{ESR}C$). The indication could alternately be an estimate of the $R_{ESR}$ value, an estimate of the ESR zero, or an estimate of the ESR zero frequency.

A PID 112 can use the indication to update the control operations of the digital controller 108.

The digital controller 108 can produce an estimate of an output voltage ripple resulting from the ESR of the output capacitor. The output voltage of the power stage can be sampled at least twice during a duty cycle period to determine the estimate of the output voltage ripple. The duty cycle period can be increased to obtain the estimate of the output voltage ripple or a high sampling rate ADC can be used.

The estimate of the output voltage ripple can be used along with an LC estimate value to produce an estimate of the zero resulting from the equivalent series resistance of the output capacitor.

The LC estimate value can be calculated by the digital controller using LCO identification block 114 or a stored value for the LC estimate can be used.

The power stage can be a buck converter or some other type of circuit.

In one embodiment, an estimate of the equivalent series resistance is calculated from an estimate of an $R_{ESR}C$ value.

The buck converter shown in FIG. 1 can have the following output transfer function:

$$\text{i. } G(s) = \frac{v_o(s)}{\delta(s)} = V_{in} \cdot \frac{1 + s\tau_{ESR}}{1 + 2\frac{\xi}{\omega_0}s + \frac{s^2}{\omega_0^2}} \quad (1)$$

where $\tau_{ESR} = R_{ESR}C$, $\omega_0 = \frac{1}{\sqrt{LC}}$ and $$\xi = \frac{(R_{dson} + R_{ESL} + R_{ESR})}{2}\sqrt{\frac{C}{L}}.$$

It can be seen that the ESR zero in equation (1) is located at the radian frequency of $$\frac{1}{R_{ESR}C}.$$

Next, we show how the product $R_{ESR}C$ can be obtained from measurements.

Since the output voltage ripple is closely correlated with $R_{ESR}$ it can be used to acquire information about the ESR zero. The amplitude of the ripple can be expressed as:

$$\Delta V_{rip} = \sqrt{(\Delta V_{ESR}^2 + \Delta V_C^2)} \quad (2)$$

where it can be decomposed into two parts, contribution from $R_{ESR}$, $\Delta V_{ESR}$ and that from the capacitor, $\Delta V_c$. They can be further expressed as follows:

$$\Delta V_{ESR} = R_{ESR} \cdot \Delta I = R_{ESR} \frac{V_g - V}{L} DT_s \quad (3)$$

$$\Delta V_C = \frac{\int_t^{t+T_s} \Delta I d\tau}{4C} = \frac{(V_g - V)DT_s^2}{8LC} \quad (4)$$

where D is the steady state duty-ratio, $\Delta I$ the inductor current ripple, $T_s$ the switching cycle.

Equation (2) can be obtained from phasor analysis where the two ripple components, $\Delta V_{ESR}$ and $\Delta V_C$, are approximated to be 90 degree out of phase. If the total voltage ripple is dominated by the contribution from ESR, i.e. $\Delta V_{rip} \approx \Delta V_{ESR}$, we can use the measured ripple amplitude to backward calculate $R_{ESR}$ and ESR zero frequency, $$f_{ESR} = \frac{1}{2\pi R_{ESR} \cdot C}$$

as shown in the equation below:

$$R_{ESR} \cdot C = \frac{LC \cdot \Delta V_{rip}}{(V_g - V)DT_s} \quad (5)$$

Note that only the accurate knowledge of the product of LC is required in (5). Fortunately, LC product can be obtained by measuring intentionally introduced small oscillations at power stage corner frequency.

Let us now show the condition for $\Delta V_{ESR}$ to dominate in (2). From equation (3) and (4) it is clear that this condition would require that the ratio of $$\frac{\Delta V_{ESR}}{\Delta V_C}$$

is greater than 1. By using equations (3-4), this condition can be expressed further in terms of frequency relations as follows:

$$\frac{\Delta V_{ESR}}{\Delta V_C} = 8ESR \cdot Cf_s = \frac{4f_s}{\pi f_{ESR}} \quad (6)$$

This condition indicates that the switch frequency of the converter, $f_s$, needs to be at least $4/\pi$ times or higher than that of the ESR zero frequency so that the ripple will be dominated by $\Delta V_{ESR}$. In other words, the ripple measurement reflects only the $f_{ESR}$ less than $f_s$. In fact, when $f_{ESR}$ is higher than half of $f_s$, its influence on the digital control loop is negligible.

Figure 2:
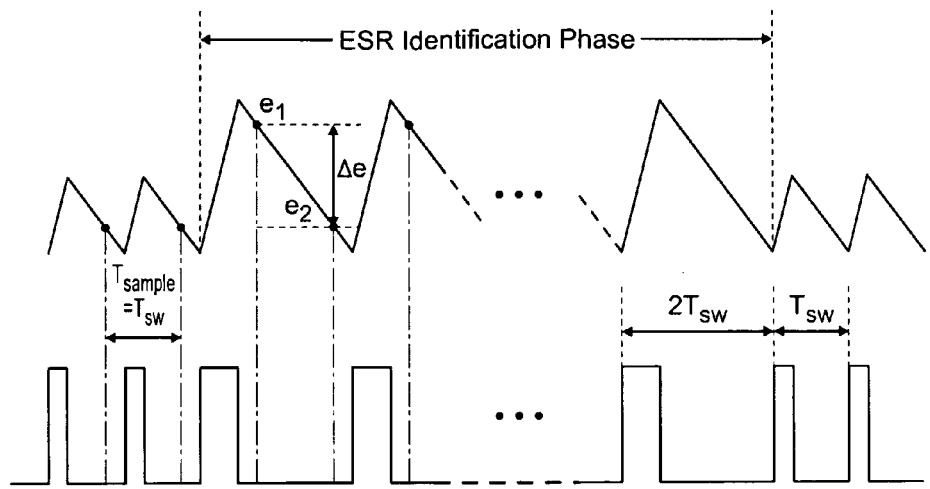
FIG. 2 are diagrams that conceptually illustrate an ESR identification phase of one embodiment.

Based on the above analysis, identifying ESR zero up to half of the switching frequency is of the most interest. To obtain higher measurement accuracy, the switching frequency during identification can be reduced to half of the switching frequency. Halving the frequency also allows for the sampling of the output voltage twice per cycle using the same ADC 116 as in the normal operation. FIG. 2 illustrates the system operation during an ESR identification phase. Two consecutive errors, $e_1$ and $e_2$ (derived from the sampling of the output voltage) can be obtained in one cycle. From the difference between these two sampled errors, $\Delta e$, the output voltage ripple, $\Delta V_{rip}$ is estimated as $\Delta V_{rip} = 2(1-D) \cdot \Delta e$ due to the linear relationship for the case when duty ratio D is less than 50%. If duty ratio D is greater than 50 percent, we can sample twice on the rising slope of the output voltage ripple; in that case the ripple estimate becomes: $\Delta V_{rip} = 2D \cdot \Delta e$. Equation (5) can be computed using a pre-stored look-up table. The following shows how the identified $R_{ESR}C$ from the calculation of equation (5) can be used in the PID design.

A proposed discrete-time PID has the form shown below:

$$PID(z) = PID_{org}(z) \cdot \frac{kz}{z-d} \quad (7)$$

$$= \frac{az^2 + bz + c}{(z-1)z} \cdot \frac{kz}{z-d}$$

$$= \frac{k(az^2 + bz + c)}{(z-1)(z-d)}$$

where a pole at an identified ESR zero will be introduced to the original PID design, $PID_{org}(z)$, which has a pole at z=0 meaning a one cycle delay or an equivalent s-plane pole at $\frac{1}{2} \cdot f_{sw}$. This is equivalent to introduce a lead-lag filter having transfer function:

$$\frac{k \cdot z}{z - d}.$$

The dc gain can be unchanged to ensure the specified bandwidth. Using final value theorem, at s=0 or z=1, the gain of the filter should remain 1, which means $$\frac{k}{1-d} = 1 \text{ or } k = 1 - d.$$

The transformation of ESR zero to discrete domain can be simply performed using pole matching equivalence that is $$d = e^{-\omega_{ESR} T_{sw}} = e^{-\frac{1}{f_{sw} ESR \cdot C}}.$$

Again, a look-up table can be employed to perform this transformation in such a low-cost controller. A comparison of loop frequency response using different PID designs is shown in FIG. 3.

Figure 3:
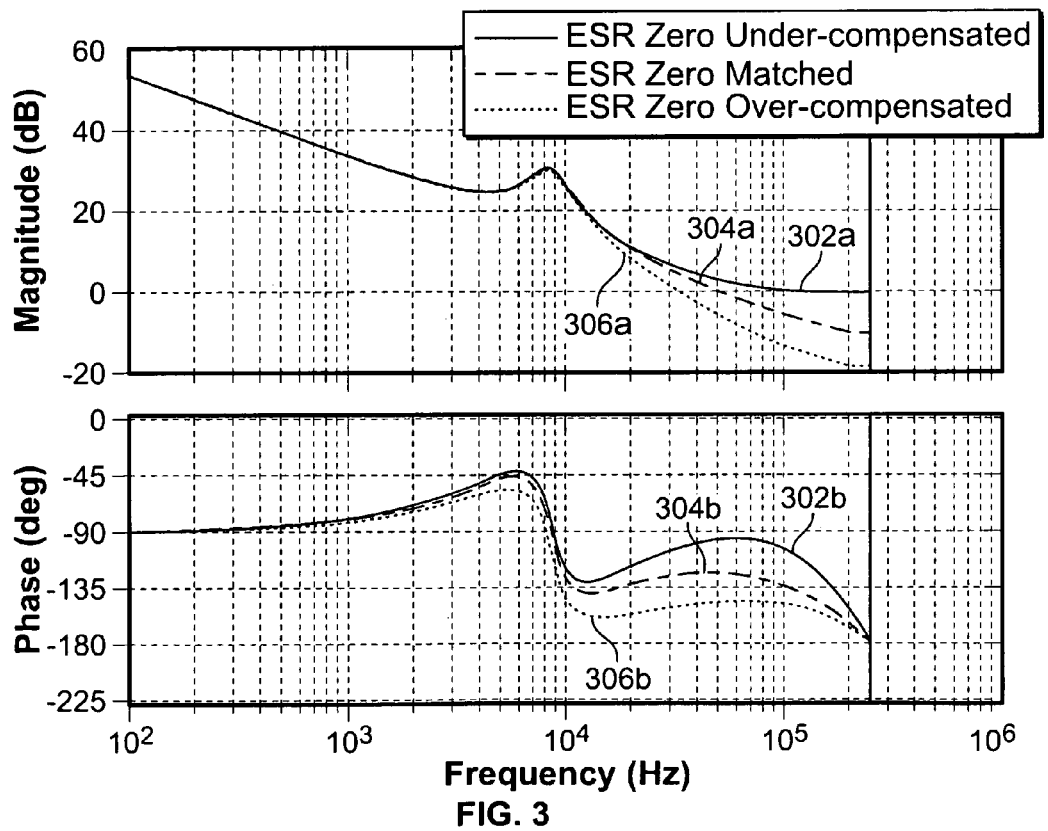
FIG. 3 is a diagram that conceptually illustrates a Bode plot of a loop transfer function with different ESR zero compensation parameters.

FIG. 3 shows Bode plots comparison of loop transfer function PID(z)*G(z) using different ESR zero compensation parameters. Red (lines 306*a* and 306*b*): d=0.77; Green (lines 304*a* and 304*b*): d=0.5 (matched with ESR zero); Blue (lines 302*a* and 302*b*): d=0. One can see the over-compensated PID, lines 306*a* and 306*b*, decrease phase margin and cause stability problems. On the other hand, the under-compensated PID, 302*a* and 302*b*, makes the system noise sensitive at high frequency. Only the proposed well-matched PID design, lines 304*a* and 304*b*, ensures stability and a desired bandwidth.

Figure 4:
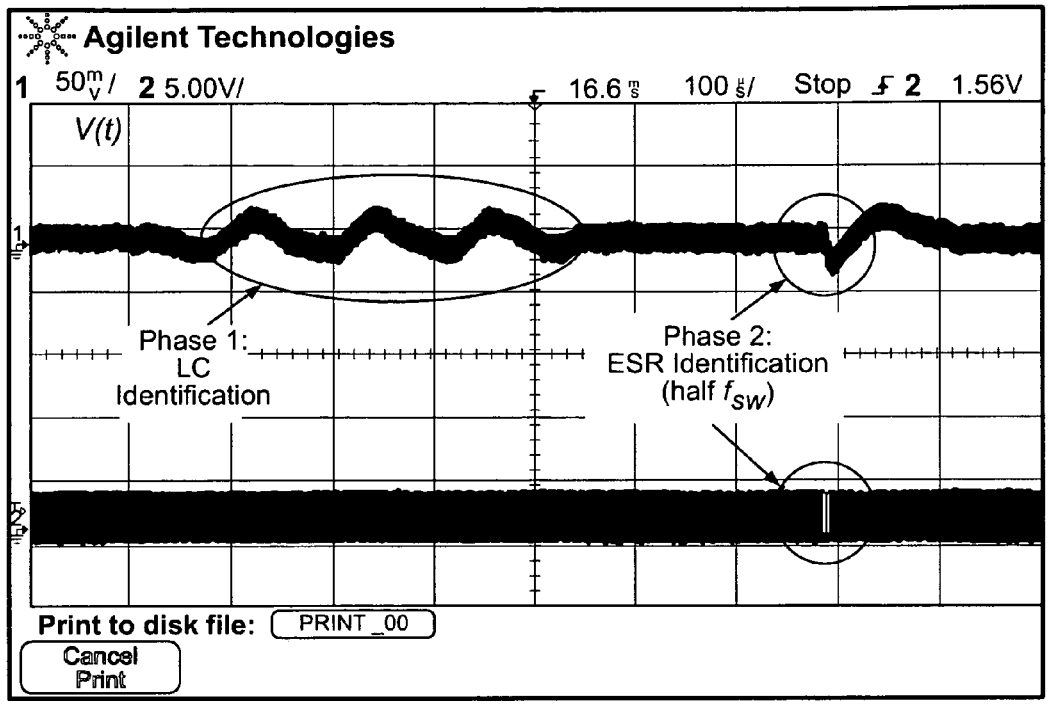
FIGS. 4-10 are diagrams that illustrate the operation of an exemplary buck converter of one embodiment of the present invention.

A Field-Programmable Gate Array (FPGA) based prototype has been built around a 12V-1.5V 500 kHz 10 W buck converter. A complete system identification test is shown in FIG. 4. As we can see, in phase 1, the power stage LC frequency is acquired from intentionally introduced self oscillations and in phase 2, the ESR zero is identified from voltage ripple measurement as switching frequency is reduced. The sudden change in switching frequency introduces a sub-transient that can be seen more evidently in FIG. 5, an enlarged view of phase 2. In one embodiment, the sub-transient induced by the frequency change is insignificant and does not affect regulation. The number of cycles that the system operates at lower switching frequency can be as small as one.

Figure 5:
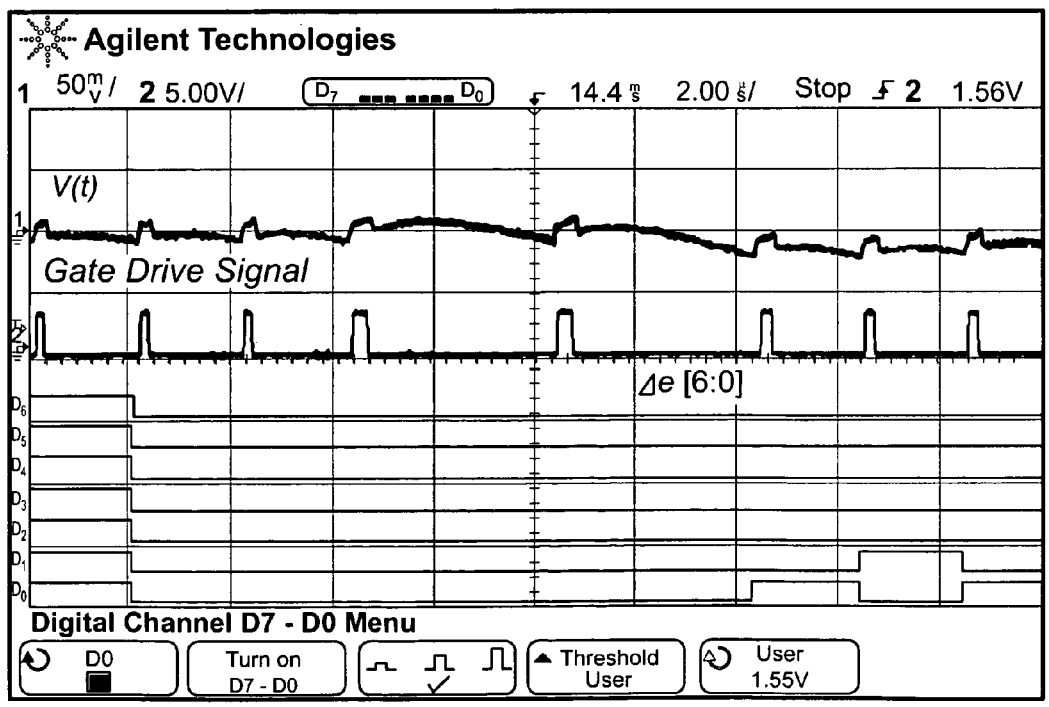
Figure 6:
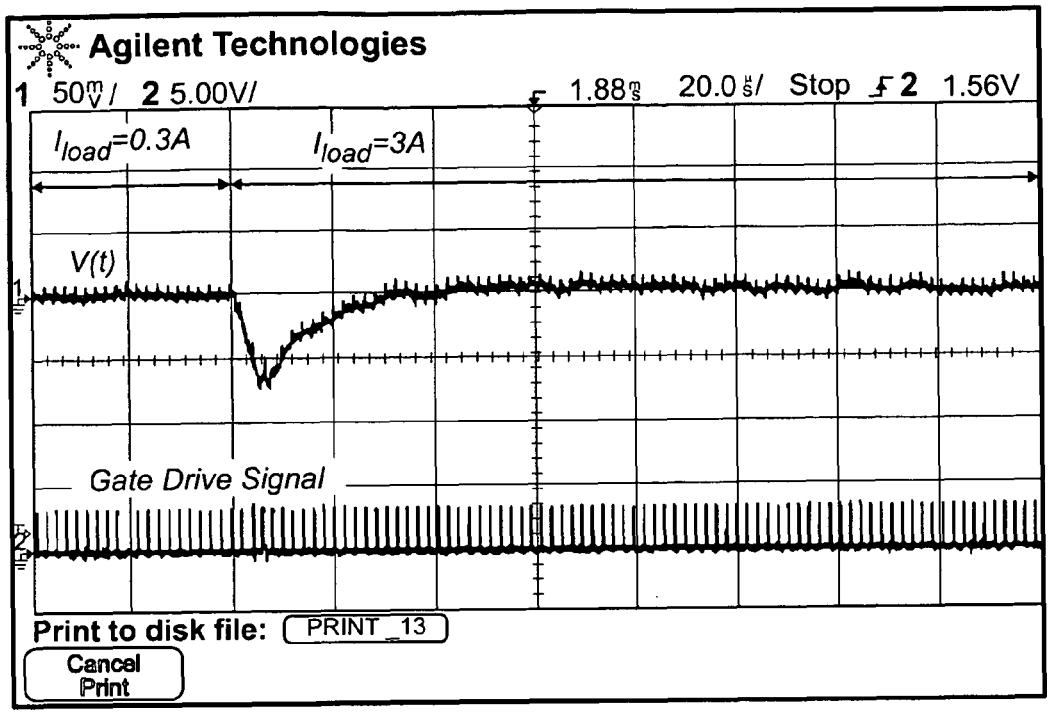
Figure 7:
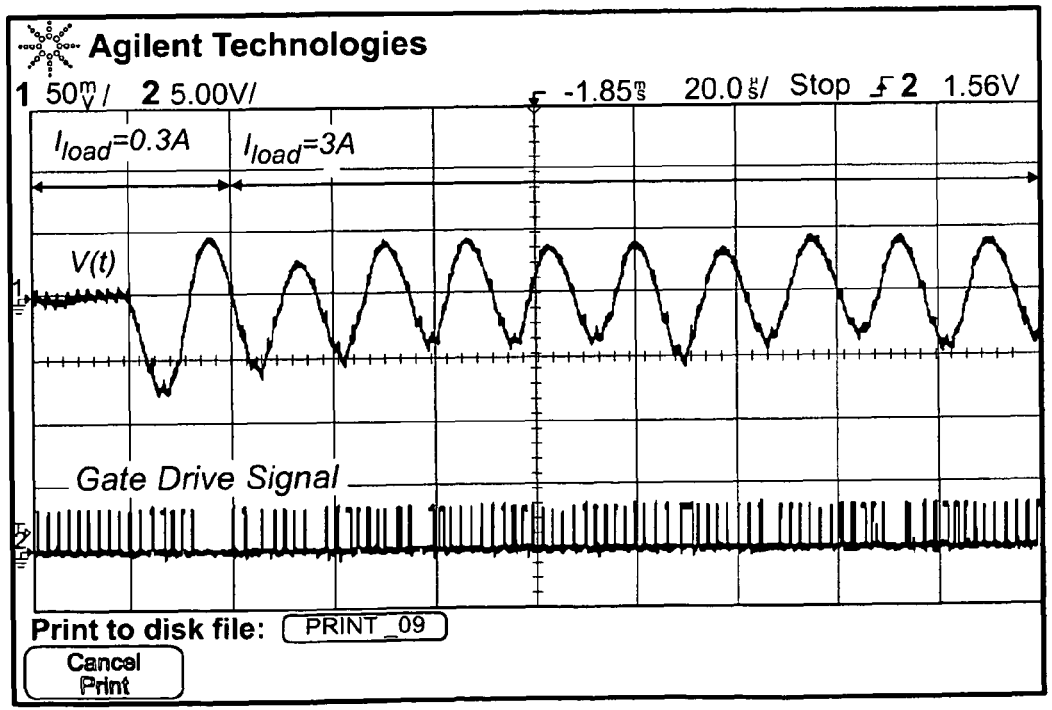

Phase 2 can also be run independently given that a rough knowledge of LC is known a priori. In the case of FIGS. 4 and 5, the measurement of a small voltage ripple indicates that the ESR zero is at high frequency close to half of the switching frequency. A PID compensator is constructed according to provide fast transient response with a control bandwidth of 50 kHz. The load transient response can be found in FIG. 6. However, if a PID designed to compensate low frequency ESR zero is used for the regulation, assuming output capacitors have large ESR, the system will become unstable. This is verified by the results in FIG. 7.

Figure 8:
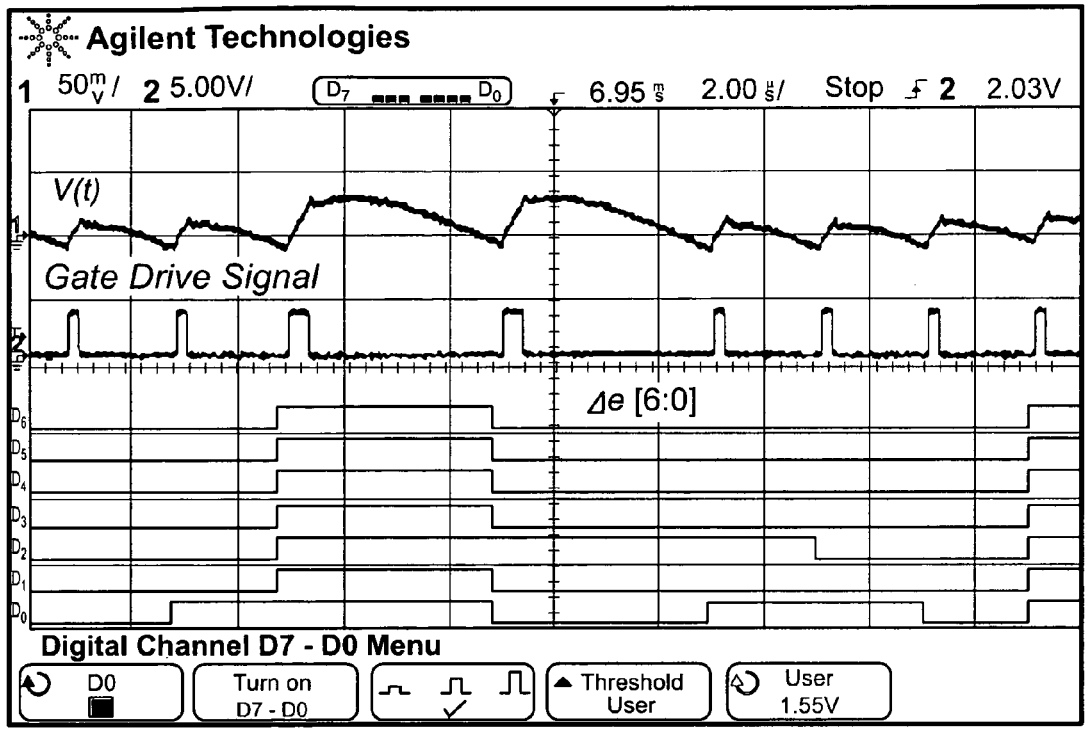
Figure 9:
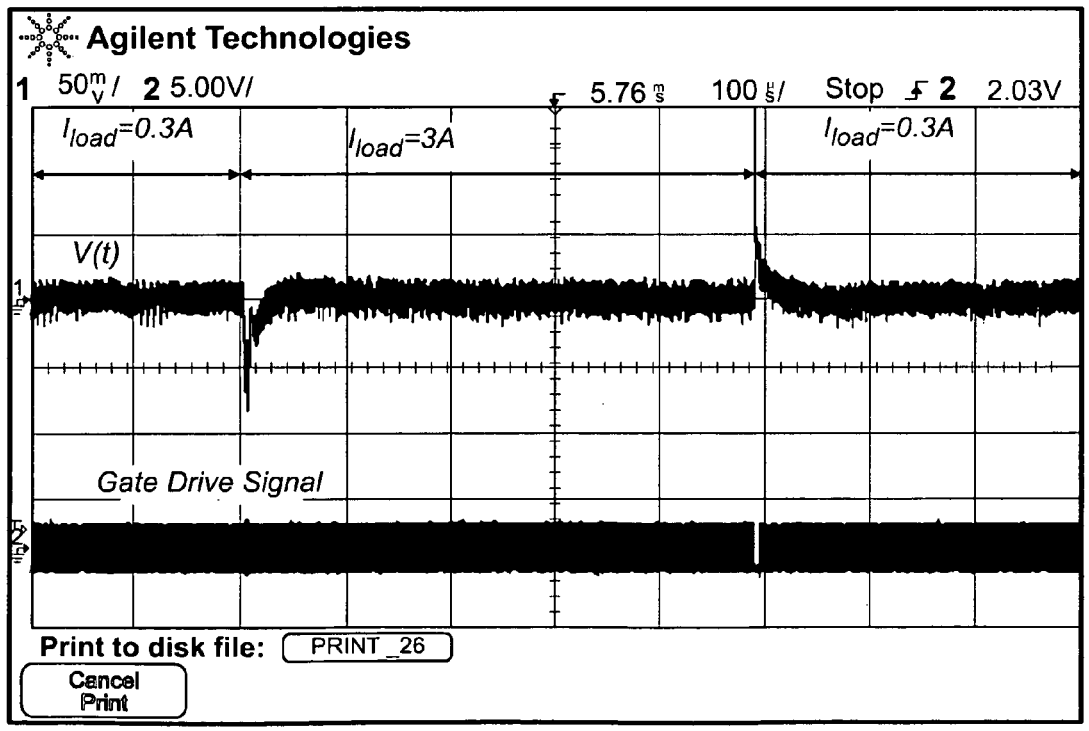
Figure 10:
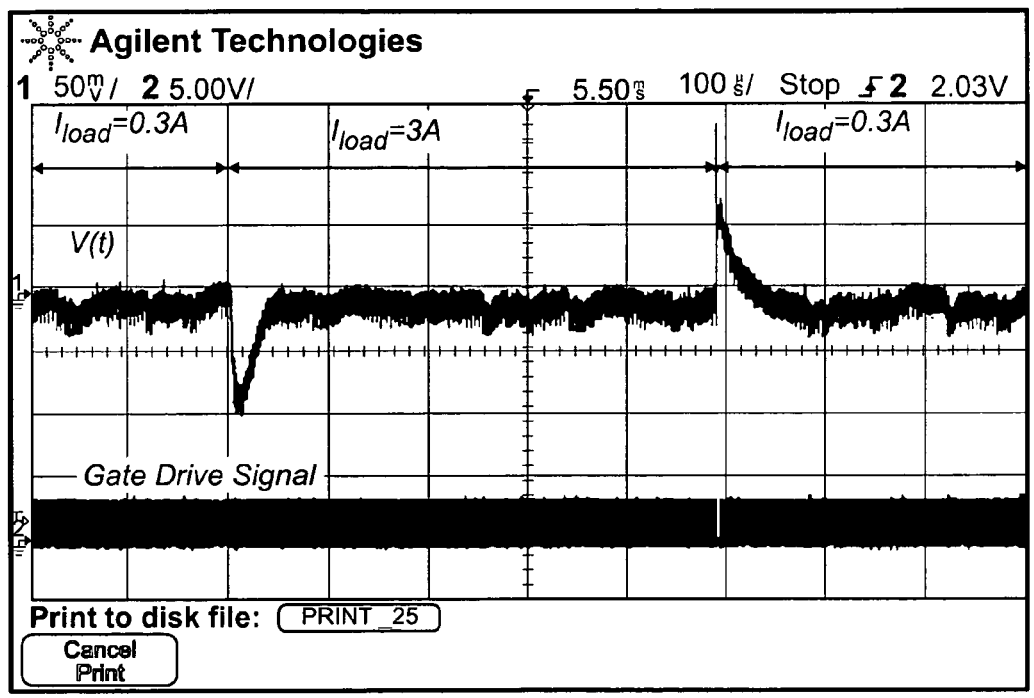

In another scenario, when output capacitors have large ESR, or low frequency ESR zero, larger output ripple is measured in FIG. 8. A PID constructed accordingly delivers satisfactory response shown in FIG. 9. However, as can be seen in FIG. 10, the PID that worked well for small ESR makes the system very sensitive to noise and adds stress to components. This confirms that the ESR identification and compensation is necessary for ensuring the system stability and a well-controlled bandwidth.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A digitally controlled DC-DC converter comprising:
   a power stage including at least one switch and an output capacitor; and
   a digital controller to control the switching of the at least one switch; wherein the digital controller includes logic to produce an indication related to a zero resulting from the equivalent series resistance (ESR) of the output capacitor and to update the control of the switching of the switch in the power stage based on the indication.

2. The digitally controlled DC-DC converter of claim 1, wherein the indication is an estimate of the total ESR of the output capacitor times the capacitance of the output capacitor.

3. The digitally controlled DC-DC converter of claim 1, wherein the power stage is a buck converter.

4. The digitally controlled DC-DC converter of claim 1, wherein the digital controller produces an estimate of an output voltage ripple resulting from the ESR of the output capacitor.

5. The digitally controlled DC-DC converter of claim 4, wherein the output voltage is sampled at least twice during a duty cycle period to determine the estimate of the output voltage ripple.

6. The digitally controlled DC-DC converter of claim 5, wherein the duty cycle period is increased to obtain the estimate of the output voltage ripple.

7. The digitally controlled DC-DC converter of claim 4, wherein an estimate of the output voltage ripple is used along with an LC estimate value to produce an estimate of the zero resulting from the ESR of the output capacitor.

8. The digitally controlled DC-DC converter of claim 7, wherein the LC estimated value is calculated by the digital controller.

9. The digitally controlled DC-DC converter of claim 1, wherein the digital controller includes a Processor Identifier (PID) that is updated with the indication.

10. A digital controller to control the switching of at least one switch of a power stage wherein the digital controller includes logic to produce an indication related to a zero resulting from the equivalent series resistance (ESR) of the output capacitor and to update the control of the switching of the switch in the power stage based on the indication.

11. The digital controller of claim 10, wherein the indication is an estimate of the total ESR of the output capacitor times the capacitance of the output capacitor.

12. The digital controller of claim 10, wherein the digital controller produces an estimate of an output voltage ripple resulting from the ESR of the output capacitor.

13. The digital controller of claim 12, wherein the output voltage is sampled at least twice during a duty cycle period to determine the estimate of the output voltage ripple.

14. The digital controller of claim 13, wherein the duty cycle period is increased to obtain the estimate of the output voltage ripple.

15. The digital controller of claim 12, wherein the estimate of the output voltage ripple is used along with an LC estimate value to produce an estimate of the zero resulting from the ESR of the output capacitor.

16. The digital controller of claim 15, wherein the LC estimate is value calculated by the digital controller.

17. The digital controller of claim 10, wherein the digital controller includes a Processor Identifier (PID) that is updated with the estimate.

18. A digital controller to control the switching of at least one switch of a power stage wherein the digital controller includes logic to produce an estimate of an equivalent series resistance (ESR) of the output capacitor and to update the control of the switching of the switch in the power stage based on the estimate.

19. The digital controller of claim 18, wherein the estimate of the equivalent series resistance is calculated from an estimate of an $R_{ESD}C$ value.

20. The digital controller of claim 18, wherein the digital controller produces an estimate of an output voltage ripple resulting from the ESR of the output capacitor.

21. The digital controller of claim 20, wherein the output voltage is sampled at least twice during a duty cycle period to determine the estimate of the output voltage ripple.

22. The digital controller of claim 21, wherein the duty cycle period is increased to obtain the estimate of the output voltage ripple.

23. The digital controller of claim 20, wherein the estimate of the output voltage ripple is used along with an LC estimate value to produce an estimate of the zero resulting from the ESR of the output capacitor.

24. The digital controller of claim 23, wherein the LC estimated value is calculated by the digital controller.

25. The digital controller of claim 18, wherein the digital controller includes a PID that is updated with the estimate.

* * * * *